Oct. 25, 1938.  W. L. MARDEN  2,134,525
DELIVERY RECORDER RESET
Filed April 24, 1936

INVENTOR
William L. Marden
BY
August, Neary & Campbell
ATTORNEYS

Patented Oct. 25, 1938

2,134,525

UNITED STATES PATENT OFFICE 2,134,525

DELIVERY RECORDER RESET

William L. Marden, Jackson Heights, N. Y., assignor to Neptune Meter Company, a corporation of New Jersey Application April 24, 1936, Serial No. 76,101

8 Claims. (Cl. 235—144)

This invention relates to registering, indicating or recording mechanism of the type wherein an element such as a number wheel, pointer or the like is reset to zero from time to time or at the end of an operation. The invention relates particularly to resetting means for such mechanism whereby an indicating element may be restored to its zero position and accurately positioned prior to a succeeding operation.

In registering devices as heretofore constructed there is danger of overthrow of the indicator beyond its zero position when the device is moved rapidly in being advanced or returned to zero due to the momentum thereof. This is particularly objectionable in resetting recording meters used for indicating the volume or amount of a liquid or fluid dispensed, for if one or more of the number wheels or indicators is thrown beyond zero the device, when subsequently operated, will indicate either more or less than the amount of fluid actually delivered. It is then frequently assumed that the meter is functioning improperly when in reality this is not the case. Moreover errors thus introduced may be very large if the number wheels which are improperly zeroized indicate hundreds or thousands of units.

In accordance with the present invention, this difficulty is overcome by the use of a driving connection between the operating means for the resetting mechanism and the number wheels or other indicator used, which connection permits the number wheels to be moved rapidly toward their zero position during the initial stages of the resetting operation but causes them to be moved relatively slowly during the final stages thereof and as they approach their zero position. In this way the number wheels are accurately set and danger of overthrow due to momentum thereof is eliminated. Furthermore the indicator may be locked in its zero position during further operation of the mechanism incidental to the resetting operation and during subsequent registering and printing operations.

While the invention is applicable to registers, recorders and counters generally, it is particularly useful as employed in conjunction with fluid dispensing devices and is hereinafter described as applied to a delivery recorder of the type disclosed in the co-pending application of Hazard and Marden, Serial No. 739,876, filed August 15, 1934, now United States Patent No. 2,126,256, granted August 9, 1938.

One of the objects of the present invention is to insure accurate resetting of indicating means of a register or the like whereby errors in zeroizing the indicating means are avoided.

Another object of the invention is to prevent overthrow of indicating means of a register in resetting the same to zero.

A further object of the invention is to provide a novel type of driving connection between operating means for resetting mechanism of an indicator and the indicating elements themselves.

Another object of the invention is to lock the indicating means of a register in zero position after being reset and during subsequent registering, printing or other operations which may take place prior to the initiation of a succeeding resetting operation.

A further object of the invention is to provide improved resetting means for a meter-actuated indicator in which accuracy of operation is assured even when the mechanism is reset rapidly.

For a more complete understanding of the invention, reference may be had to the accompanying figures of the drawing, in which.

Figure 1:
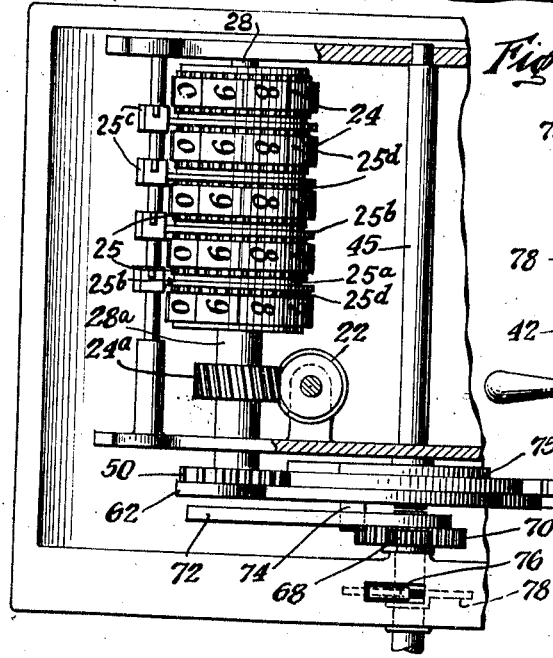
Figure 1 is a vertical sectional view through a portion of a delivery recorder having a typical form of resetting mechanism embodying the present invention applied thereto.
Figure 2:
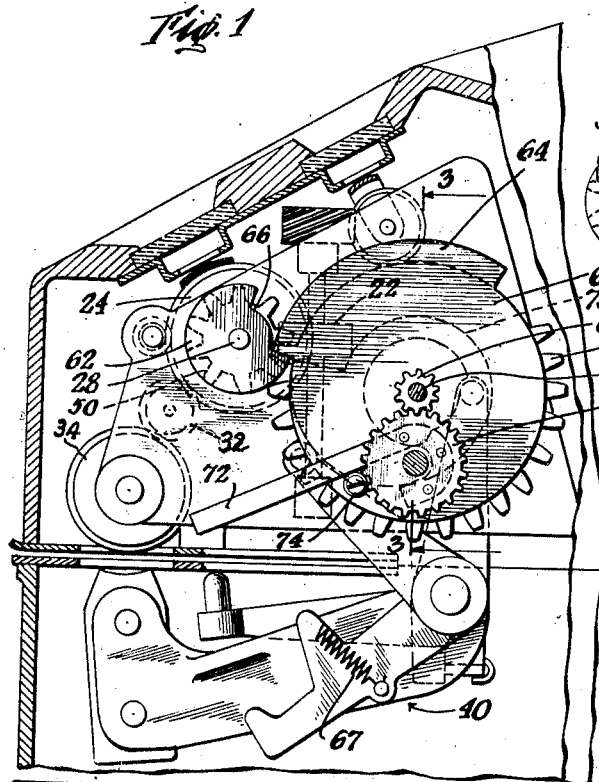
Figure 2 is a plan view of the mechanism of Figure 1 with the cover of the recorder removed.

That form of the invention chosen for the purpose of illustrating a typical embodiment thereof is hereinafter described as applied to the delivery recorder of said co-pending application, parts of which are illustrated in the drawing.

The delivery recorder includes an operating handle 42 which is movable prior to a delivery operation to reset the recording mechanism and the number wheels 24 thereof to their zero position. The number wheels are mounted on a shaft 28 and are each movable with respect thereto during a delivery operation by means of a meter driven spiral gear 22 which meshes with gear 24a. The gear 24a is carried by a sleeve 28a rotatably mounted on shaft 28 and provided with a collar 28c carrying pivoted pawls 24b for engaging the notched inner surface of the number wheel of lowest order to drive said number wheel during a delivery operation but to permit the number wheel to be rotated independently thereof during a resetting operation. Gears 25 are associated with each of the number wheels of higher order and are each provided with pawls 24b similar in operation to those carried by the collar 28c on the sleeve 28a. The usual mutilated gears 25a, lock discs 25b and transfer pinions 25c of the Geneva type are provided for transferring movement of each number wheel to the number of wheel of next higher order, as is conventional in computing or counting devices. The gears 25d associated with each of the number wheels are utilized as take-off gears with which idler gears 32 mesh in driving the corresponding printing wheels 34. Thus the number wheels 24 and printing wheels 34 are driven from the meter driven gears 22 and 24a during a delivery operation but are capable of being rotated independently of the meter driven elements during a resetting operation. As described more fully in said co-pending application, the construction also includes a printing element 40 which cooperates with other elements actuated by the register to print a record from the printing wheels 34 of the amount of liquid delivered. The printing element is actuated by spring 67 after completion of a delivery operation and prior to resetting of the number wheels in response to predetermined movement of cam 75 secured to shaft 45 and rotatable therewith by handle 42.

In resetting the mechanism illustrated, after a printing operation and preparatory to a succeeding delivery operation, the shaft 28 is driven by a gear 50 secured thereto and meshing with a larger gear 49 secured to the shaft 45. The shaft 45 in turn is driven from the operating handle 42 or other suitable means through a novel driving connection hereinafter described. During rotation of the shaft 28 the collar 28c is held against rotation by the gears 22 and 24a, the pawls 24b permitting the number wheels to be picked up and rotated with the shaft 28 by means of pivoted pawls 26 carried by the number wheels 24 and movable into engagement with a groove 27 in the shaft 28. Rotation of the shaft 28 thus causes the number wheels to be carried thereby and as shown they are advanced to their zero position rather than moved in a reverse direction.

While resetting of the number wheels is effected by engagement of the pawls 26 with the shaft 28, it sometimes occurs that one or more of the pawls fails to engage during the first rotation of shaft 28 and a number wheel therefore may not be fully reset in the first rotation of shaft 28. For this reason, the gear 49 is so proportioned with respect to gear 50 that the shaft 28 is rotated a plurality of times for each complete rotation of the gear 49. However the gear 49 is mutilated by the omission of teeth therefrom throughout a portion of its circumference so that the gear 50 and shaft 28 are in fact driven through only two complete rotations in each resetting operation. This has been found sufficient to assure engagement of each of the pawls 26 with shaft 28 and resetting of all of the number wheels to zero.

During the period in which the gear 50 is disengaged from gear 49, due to the omission of teeth therefrom, the gear 50 is held against further rotation or displacement by means of a cam 60 secured to gear 49 and engaging a complementary cam 62 secured to the gear 50. The node 64 on cam 60 enters the dwell 66 on cam 62 and holds the gear 50 in position so that the teeth on gear 49 will accurately mesh with those on gear 50 when they again engage at the start of a succeeding resetting operation. Rotation of gear 50 and shaft 28 is thus controlled so that the number wheels are moved accurately to their zero positions at the termination of each resetting operation. The cams 60 and 62 also serve to hold the shaft 28 against rotation during the metering, registering, printing and other operations which take place between successive resetting operations.

Figure 4:
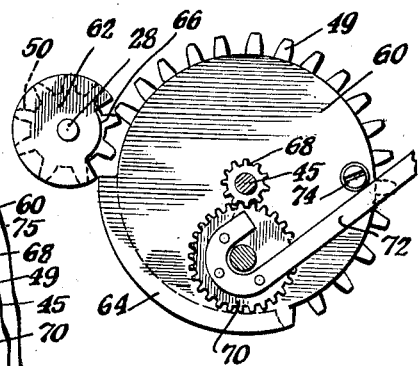
Figure 4 illustrates a detail of the driving connection of Figure 1 with the parts thereof in a different position.
Figure 5:
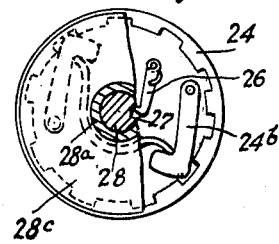
Figure 5 is a vertical sectional view taken on the line 5—5 of Figure 3, with parts broken away to show the interior of a counting wheel.
Figure 3:
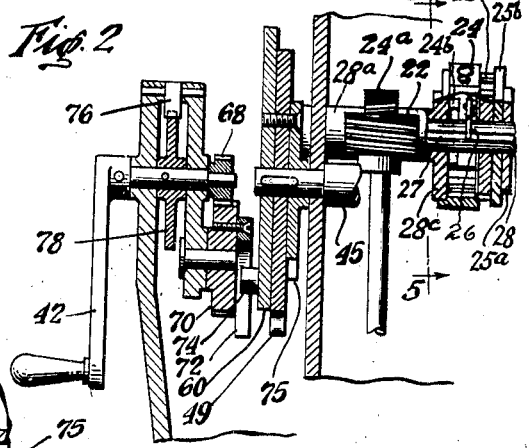
Figure 3 is a vertical sectional view of a portion of the mechanism of Figure 1 taken on the line 3—3 thereof.

In order that the mechanism may be reset rapidly during the initial stages of the operation but prevented from overthrow as the number wheels or indicator approach zero, the gear 49 is driven from the operating handle through novel connections which vary the speed of rotation of the gear 49. The driving connection illustrated includes a gear 68 secured to the operating handle 42 and meshing with a gear 70 located eccentric to the gear 49 and shaft 45. The gear 70 is provided with a driving arm 72 extending therefrom and engaging a driving pin 74 secured to cam 60 carried by gear 49 near the periphery of the gear thereof to drive the same. When the gears are in the position illustrated in Figure 4, the effective length of the driving arm 72 is comparatively great so that the gear 49 is rotated at relatively high speed as gear 70 is turned by gear 68 and the operating handle. However, as the gear 49 continues to rotate and pin 74 approaches the gear 70, the effective length of the driving arm 74 is reduced until the parts are in the position illustrated in Figure 1, at which time the number wheels are approaching their zero positions and the gear 49 is rotated relatively slowly. The mutilated portion of gear 49 from which teeth are omitted also approaches gear 50 as the driving arm 72 nears the position of Figure 1 so that the gears are disengaged. As gear 49 rotates further the node 64 on cam 60 enters the dwell 66 on cam 62 holding the gear 50 against rotation while gear 49 is rotated further by the driving arm 72.

Continued rotation of gear 49 is utilized in the construction of said co-pending application for actuating printing elements of the device, but such rotation may be used for other purposes, if desired. At the conclusion of such further rotation, the gear 49 is in position to cause the teeth thereon to again engage gear 50 for resetting the indicator and the driving arm is in the position of Figure 4.

Rotation of the handle 42 in the reverse direction preferably is prevented by means of a pawl 76 pivoted on the frame and engaging ratchet teeth in the member 78 secured to the handle. Improper operation of the handle which might injure the registering mechanism is thus prevented.

The operation of the mechanism illustrated will be apparent from the foregoing description thereof but may be summarized, as follows: Upon completion of a dispensing or registering operation the number wheels, which have been actuated through the spiral gear 22 from the meter, are disposed in those positions indicating the amount of fluid delivered. The arm 72 and gear 49 are then in approximately the position of Figure 1, to which they were moved in a preceding resetting operation. The handle 42 is then rotated for actuating the printing mechanism thereby rotating gears 68 and 70, and advancing gear 49 without rotating gear 50 until the driving pin 74 and arm 72 are in the positions illustrated in Figure 4. Thereafter the teeth on gear 49 engage the teeth on gear 50 and the mechanism is reset by rotating the operating handle two complete rotations. During the initial portion of the resetting movement the effective length of the driving arm is relatively great and the gear 49 and shaft 28 are therefore rotated rapidly. The shaft 23 in rotating picks up the number wheels by engagement of the pawls 26 in the groove 27 and since the shaft 28 is given two complete rotations in its resetting movement, any pawls which fail to engage in the first rotation will be engaged on the succeeding rotation of the shaft.

As rotation of the operating handle is continued and gear 70 rotated, the pin 74 is carried toward the gear 70 and the effective length of the driving arm 72 is reduced. The speed of rotation of the gears 49 and 50 and shaft 28 therefore diminishes so that the number wheels are moved slowly to their zero positions without danger of overthrow. After being accurately reset the mutilated portion of gear 49 is presented to the gear 50 releasing the latter so that the shaft 49 and gear 45 may continue to rotate without advancing the number wheels beyond zero. At the same time the cams 60 and 62 engage to retain the gear 50 and shaft in position to prevent movement thereof during the succeeding registering, printing, and other operations of the mechanism.

While the construction illustrated and described is designed for resetting number wheels which are advanced or moved forward to reset the same, the invention is also applicable to constructions wherein the direction of rotation of the number wheels or indicator is reversed in the resetting operation. It will also be evident that the invention is applicable to other types of mechanism than the delivery recorder shown since the resetting of number wheels or other indicators takes place in the operation of many different devices. Moreover it may be desirable in some instances to employ a driving connection between the operating means or handle and the resetting mechanism which is altogether different in construction from that shown, particularly when the invention is adapted or applied to other types and kinds of registering or counting devices. In view thereof, it should be understood that the form of the invention herein shown and described is intended to be illustrative of a typical embodiment thereof and is not intended to limit the scope of the invention.

I claim:

1. In a registering device, an indicator, means for resetting said indicator to zero, operating means for said resetting means, means for preventing overthrow of the indicator including a driving connection between said operating means and said resetting means embodying a rotatable driving arm actuated by said operating means and a member engageable thereby, located eccentric to the axis of rotation of said driving arm and operatively connected to said resetting means, said driving connection serving on rotation thereof to impart rapid movement of said resetting means during a portion of the resetting operation and to actuate said resetting means more slowly as said indicator approaches zero and retaining means movable by said member into engagement with said resetting means at the conclusion of a resetting operation to accurately position said indicator and prevent continued operation of said resetting means.

2. In a registering device, a shaft, an indicator carried by said shaft and rotatable with respect thereto during a registering operation, means for connecting said indicator to said shaft, operating means for rotating said shaft to reset said indicator to zero, a driving connection between said operating means and shaft, said drive means including a rotatable driving arm actuated by said operating means, an element operatively connected to said shaft and positioned eccentric to the axis of rotation of said driving arm to be engaged thereby to rotate said shaft at varying speeds and means rotatable by said driving arm to lock said shaft against continued movement after said indicator has been reset to zero.

3. In a registering device, a shaft, an indicator carried by said shaft and rotatable with respect thereto during a registering operation, means for connecting said indicator to said shaft, operating means for rotating said shaft to reset said indicator to zero, gears between said operating means and shaft movable into driving relation to rotate said shaft for resetting said indicator and movable out of driving relation thereafter, a variable speed driving connection between said operating means and said gears for driving said shaft rapidly during initial resetting movement of the indicator and for driving said shaft slowly as said indicator approaches its zero position, and means actuated upon movement of said gears out of driving relation for preventing rotation of said shaft.

4. In a registering device, a shaft, an indicator carried by said shaft and rotatable with respect thereto during a registering operation, means for connecting said indicator to said shaft, operating means for rotating said shaft to reset said indicator to zero, gears between said operating means and shaft movable into and out of driving relation a variable speed driving connection between said operating means and said gears for driving said shaft rapidly during initial resetting movement of the indicator and for driving said shaft slowly as said indicator approaches its zero position, and inter-engaging members movable in response to movement of said gears and engageable upon movement of said gears out of driving relation for preventing rotation of said shaft between resetting operations.

5. In a registering device, a shaft, an indicator carried by said shaft and rotatable with respect thereto during a registering operation, means for connecting said indicator to said shaft in a predetermined position with respect thereto, operating means for rotating said shaft to reset said indicator to zero, and a driving connection between said operating means and said shaft including a rotatable driving arm actuated by said operating means, a gear for rotating said shaft having an element carried thereby near the periphery thereof and positioned to be engaged by said driving arm, said gear and driving arm being rotatable about axes eccentric to each other whereby said gear is driven at a variable speed by said driving arm, the element on said gear being positioned to rotate said shaft at relatively high speed during the initial stages of the resetting operation and to rotate said shaft relatively slowly when said indicator is approaching its zero position, and means carried by said gear and said shaft for imparting final resetting movement to the indicator and for preventing rotation of said shaft between successive resetting operations.

6. In a registering device, a shaft, an indicator carried by said shaft and rotatable with respect thereto during a registering operation, means for connecting said indicator to said shaft in a predetermined position with respect thereto, operating means for rotating said shaft to reset said indicator to zero, and a driving connection between said operating means and said shaft including a rotatable driving arm actuated by said operating means, a gear for rotating said shaft having an element carried thereby near the periphery thereof and positioned to be engaged by said driving arm, said gear and driving arm being rotatable about axes eccentric to each other whereby said gear is driven at a variable speed by said driving arm, the element on said gear being positioned to rotate said shaft at relatively high speed during the initial stages of the resetting operation and to rotate said shaft relatively slowly when said indicator is approaching its zero position, and members movable with said gear and shaft engageable to impart final resetting movement to said shaft and to prevent rotation of said shaft upon rotation of said gear between successive resetting operations.

7. In a registering mechanism having registering elements, resetting means for said elements including a shaft and a gear for driving the shaft, a mutilated gear meshing with said driving gear during a portion only of each rotation of said multilated gear, and means controlling operation of said resetting means to avoid overthrow of said elements comprising an operating member and means movable thereby into engagement with said resetting means to impart the final resetting movement to said resetting means as said registering elements approach their zero positions and to prevent rotation of said shaft upon disengagement of said mutilated gear from said driving gear.

8. In a registering mechanism having registering elements, resetting means for said elements, means controlling operation of said resetting means to avoid overthrow of said elements comprising an operating member, a mutilated gear actuated by said operating member to drive said resetting means during a portion only of each rotation thereof, locking and positioning means movable with said mutilated gear into engagement with said resetting means to position said registering elements and to lock said resetting means against movement during the remaining portion of each rotation of said mutilated gear, and a variable speed driving connection between said operating member and said mutilated gear to actuate said resetting means and said positioning and locking means slowly as said registering elements approach zero and said positioning and locking means engage said resetting means.

WILLIAM L. MARDEN.